(12) United States Patent
Shan (10) Patent No.: US 11,786,854 B2
(45) Date of Patent: Oct. 17, 2023

(54) VENTILATION ASSEMBLY AND AIR CONDITIONING APPARATUS

(71) Applicant: BEIJING XIAOMI MOBILE SOFTWARE CO., LTD., Beijing (CN)

(72) Inventor: Lianyu Shan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 213 days.

(21) Appl. No.: 17/360,952

(22) Filed: Jun. 28, 2021

(65) Prior Publication Data

US 2022/0233985 A1 Jul. 28, 2022

(30) Foreign Application Priority Data

Jan. 25, 2021 (CN) .......................... 202120198593.2

(51) Int. Cl.
*B01D 46/00* (2022.01)
*B01D 46/16* (2006.01)
*B01D 46/42* (2006.01)
*F24F 13/28* (2006.01)

(52) U.S. Cl.
CPC ......... *B01D 46/0006* (2013.01); *B01D 46/16* (2013.01); *B01D 46/4227* (2013.01); *F24F 13/28* (2013.01); *B01D 2271/02* (2013.01); *B01D 2279/35* (2013.01); *B01D 2279/50* (2013.01)

(58) Field of Classification Search
CPC ................ B01D 46/0006; B01D 46/16; B01D 46/4227; B01D 2271/02; B01D 2279/35; B01D 2279/50; B01D 2271/00; B01D 2271/022; F24F 13/28; F24F 1/0073; F24F 7/003

USPC ........................................................... 55/356
See application file for complete search history.

(56) References Cited

U.S. PATENT DOCUMENTS

2011/0277442 A1* 11/2011 Drobniak ............. B01D 46/001
60/39.092

FOREIGN PATENT DOCUMENTS

| CN | 108386927 A | * | 8/2018 | ............. A47B 97/00 |
| CN | 108386927 A | | 8/2018 | |
| CN | 210399176 U | * | 4/2020 | |
| EP | 3734172 A1 | | 11/2020 | |
| FR | 2896016 A1 | | 7/2007 | |

OTHER PUBLICATIONS

European Patent Application No. 21182293.7, Search and Opinion dated Dec. 20, 2021, 8 pages.

* cited by examiner

*Primary Examiner* — Robert A Hopkins
*Assistant Examiner* — Qianping He
(74) *Attorney, Agent, or Firm* — COZEN O'CONNOR (57) ABSTRACT

A ventilation assembly and an air conditioning apparatus are provided. The ventilation assembly includes: a volute, a surface of the volute being provided with a mounting port; a filter assembly arranged in the mounting port or in a portion of the volute adjacent to the mounting port; and a sealing member arranged with the mounting port or with the portion of the volute adjacent to the mounting port, and configured to seal a gap between the filter assembly and the mounting port.

17 Claims, 6 Drawing Sheets

VENTILATION ASSEMBLY AND AIR CONDITIONING APPARATUS

CROSS-REFERENCE TO RELATED APPLICATION

The present disclosure is based upon and claims priority to Chinese Patent Application No. 202120198593.2, filed on Jan. 25, 2021, the entire content of which is incorporated herein by reference.

TECHNICAL FIELD

The present disclosure relates to a field of air conditioning technologies, and in particular to a ventilation assembly and an air conditioning apparatus.

BACKGROUND

In the related art, an air-conditioning apparatus has a ventilation assembly configured to realize a fresh air function of indoor and outdoor air exchange. When the air-conditioning apparatus having the ventilation assembly operates in an environment with a large temperature difference between indoor and outdoor, due to the poor sealing performance of the ventilation assembly, condensation often appears on the ventilation assembly, and drips to the floor and wall, thus damaging the indoor home environment and affecting the user experience.

SUMMARY

According to a first aspect of embodiments of the present disclosure, a ventilation assembly is provided, including: a volute, a surface of the volute being provided with a mounting port; a filter assembly arranged in the mounting port or in a portion of the volute adjacent to the mounting port; and a sealing member arranged with the mounting port or with the portion of the volute adjacent to the mounting port, and configured to seal a gap between the filter assembly and the mounting port.

According to a second aspect of embodiments of the present disclosure, an air conditioning apparatus is provided, including a ventilation assembly. The ventilation assembly includes: a volute, a surface of the volute being provided with a mounting port; a filter assembly arranged in the mounting port or in a portion of the volute adjacent to the mounting port; and a sealing member arranged with the mounting port or with the portion of the volute adjacent to the mounting port, and configured to seal a gap between the filter assembly and the mounting port.

It is to be understood that both the foregoing general description and the following detailed description are exemplary and illustrative only and shall not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to the illustrative embodiments, examples of which are illustrated in the accompanying drawings. When the following description refers to the accompanying drawings, same numerals in different drawings indicate the same or similar elements, unless otherwise indicated. The embodiments described in the following illustrative embodiments do not represent all embodiments consistent with the present disclosure. Rather, they are merely examples of devices consistent with some aspects of the present disclosure as detailed in the appended claims.

Figure 1:
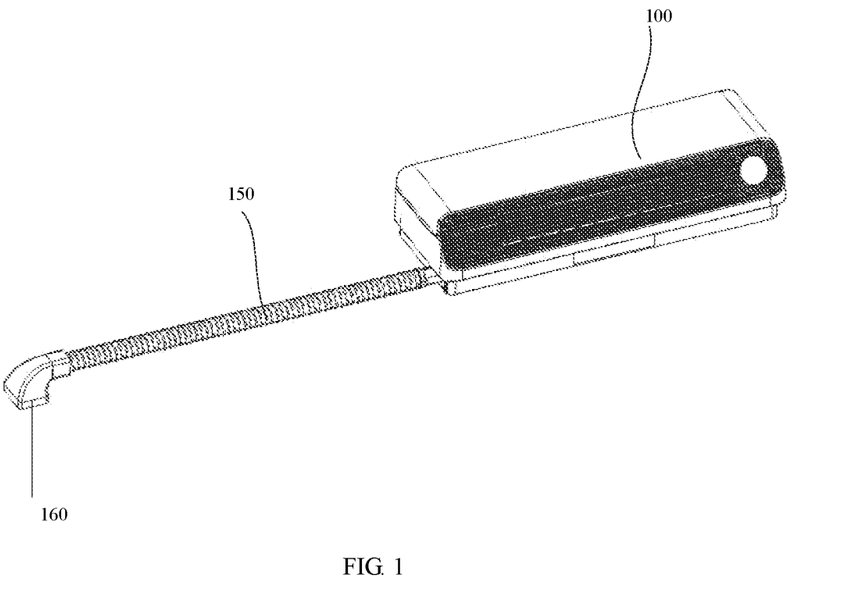
FIG. 1 is a schematic view of an air conditioning apparatus in the related art.
Figure 2:
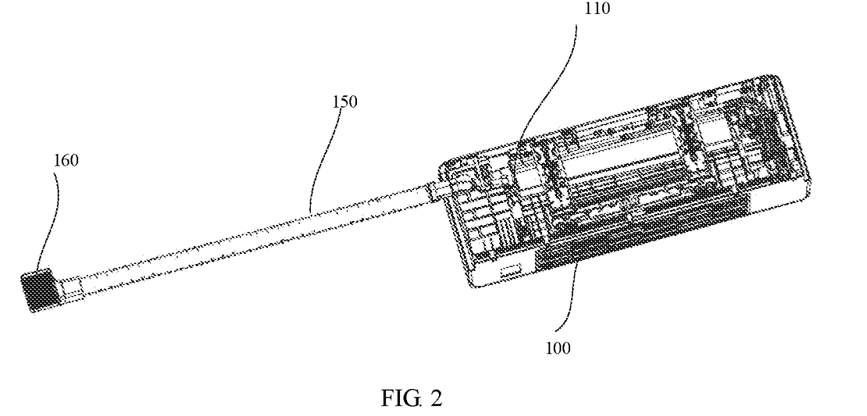
FIG. 2 is a sectional view of the air conditioning apparatus in FIG. 1.

As shown in FIGS. 1 and 2, in an air conditioning apparatus in the related art, taking an air conditioner as an example, a ventilation assembly is provided in an indoor unit 100 of the air conditioner, one end of an air input pipe 150 of the indoor unit 100 is communicated with the ventilation assembly, and the other end of the air input pipe 150 is connected with a wind shield 160 for guiding an air flow in an outdoor environment into the air input pipe 150.

When the temperature difference between indoor and outdoor is large (for example, the outdoor temperature is lower than −20° C.), a cold air flow entering the ventilation assembly may leak out from a gap of the ventilation assembly due to a poor sealing condition of the ventilation assembly in the related art. Warm air in the air conditioning apparatus liquefies when it meets the cold air flow, thereby resulting in condensation. When the condensation is significant, the condensation can form water droplets, which may drip to an indoor floor of a user, and even flow to a wall to form water stains, thus affecting the user experience.

Figure 3:
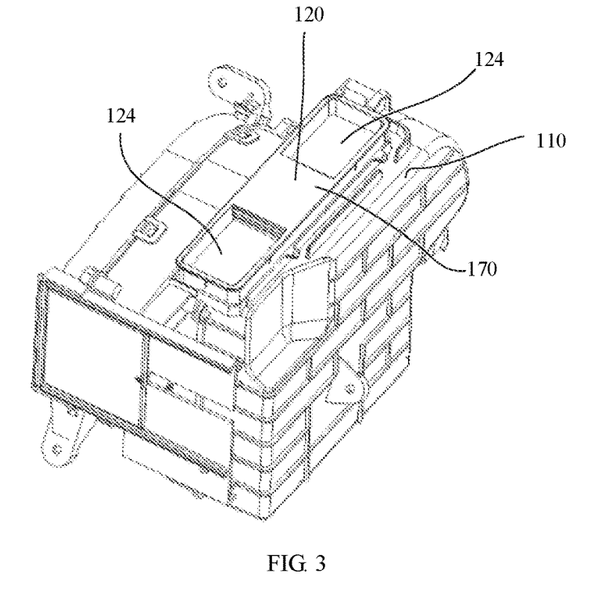
FIG. 3 is a schematic view of a ventilation assembly according to an illustrative embodiment of the present disclosure.
Figure 4:
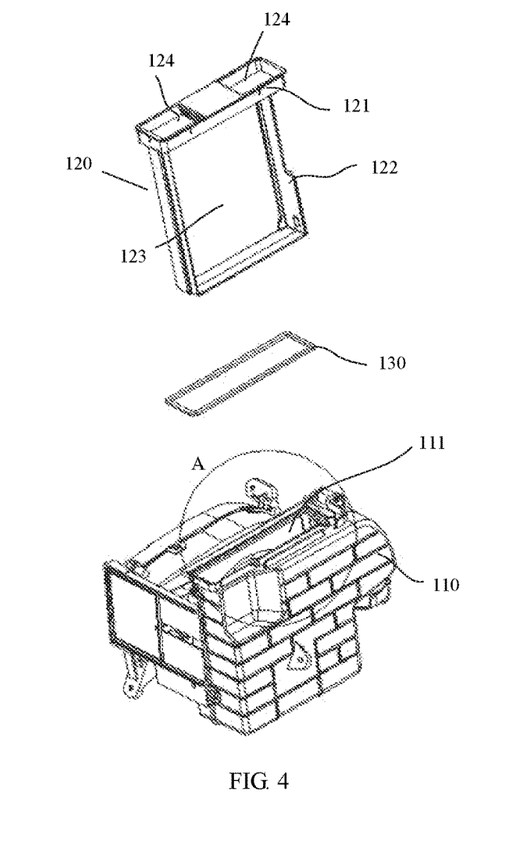
FIG. 4 is a partial exploded view of the ventilation assembly of FIG. 3.

Referring to FIGS. 3 and 4, in an embodiment of the present disclosure, a ventilation assembly is provided, including a volute 110, a filter assembly 170, and a sealing member 130. A surface of the volute 110 is provided with a mounting port 111. The filter assembly 170 is arranged in the mounting port 111 or in a portion of the volute 110 adjacent to the mounting port 111. The filter assembly 170 is configured to filter out pollutant particles such as dust or smoke in air flowing through an air channel 115 so as to purify the air.

The sealing member 130 is positioned at the mounting port 111 or at the portion of the volute 110 adjacent to the mounting port 111, and is configured to seal a gap between the filter assembly 170 and the mounting port 111. Or, the sealing member 130 is located between the filter assembly and the volute, and cooperates with the filter assembly to seal the mounting port.

In the above embodiment, the sealing member 130 can seal the gap between the filter assembly 170 and the mounting port 111, so as to enhance the sealing performance at the mounting port 111, and prevent the air flow entering the volute from the outside from leaking out from the gap between the filter assembly 170 and the volute 110 when the ventilation assembly operates, thus greatly reducing the condensation generated when the temperature difference between indoor and outdoor is large, and improving the user experience.

As can be understood, in an example, the ventilation assembly further includes a fan assembly 140 arranged in the volute 110 and configured to drive the air to flow by rotation. The mounting port 111 may serve as an air inlet of the air channel 115. In this case, an air input face of the fan assembly 140 facing the mounting port 111. The mounting port 111 may also serve as an air outlet of the air channel 115. In this case, an air output face of the fan assembly 140 facing the mounting port 111. Or, as shown in FIG. 3, the mounting port 111 may not be the air inlet nor the air outlet, but may be an opening arranged between the air inlet and the air outlet. In this case, the air output face or the air input face of the fan assembly 140 may face the mounting port 111.

In some embodiments, the sealing member has a shape substantially the same with a shape of the gap between the filter assembly and the mounting port to seal the gap between the filter assembly and the mounting port.

In some embodiments, the sealing member 130 is made of an elastic material such as rubber, plastic, silica gel or the like, and the sealing member 130 of the elastic material can seal the gap at the mounting port 111 with the elasticity of the material, which is conducive to improving the sealing effect.

In some embodiments, the filter assembly 170 includes a bracket 120, a part of the bracket 120 adjacent to the mounting port 111 is formed to have a shape substantially the same with that of the mounting port 111 to cover the mounting port 111. The sealing member is arranged between the bracket 120 and the volute 110 and has a shape substantially the same with a shape of a gap between the bracket 120 and the mounting port 111 so as to form a sealing for the gap between the volute 110 and the bracket 120 at the mounting port 111.

In some embodiments, an air channel 115 communicated with the mounting port 111 is provided inside the volute 110, and the filter assembly 170 further includes a filter screen mounted to the bracket 120 and arranged in the air channel 115.

The bracket 120 has a larger mechanical strength than the filter screen, the bracket 120 is configured to support the filter screen, and the filter screen is mounted to the volute 110 through the bracket 120.

In some embodiments, the filter screen may be arranged entirely within the air channel 115, and at least part of the bracket 120 is arranged at the mounting port 111 for covering the mounting port 111 and for sealing the mounting port 111 together with the sealing member 130.

In some embodiments, the part of the bracket 120 covering the mounting port 111 has a substantially plate-shaped structure, a bottom surface of the plate-shaped structure faces the air channel 115, and the filter screen is in contact with the bottom surface of the plate-shaped structure.

In some embodiments, at least part of the filter assembly 170 is exposed outside the volute 110.

In actual applications, after a long-term use, the filter assembly 170 tends to be clogged due to the accumulation of excessive particulate matters, thereby affecting the filtering effect. Thus, the filter assembly 170 needs to be periodically cleaned or replaced. Since at least part of the filter assembly 170 is exposed outside the volute 110, it is convenient to detach the filter assembly 170 so as to realize the replacement or cleaning of the filter assembly 170.

In some embodiments, part of the bracket 120 of the filter assembly 170 is exposed outside the volute 110 and a user may take the filter screen out of the mounting port 111 by detaching the bracket 120.

In some embodiments, the bracket 120 includes an operating member arranged with a surface facing away from the air channel 115. The operating member may be a tab. Or, as shown in FIG. 2, the operating member may be a slot 124 formed in the bracket 120, and the user may detach the filter assembly 170 from the mounting port 111 by pulling the tab or hooking the slot 124. Thus, the arrangement of the operating member facilitates the replacement of the filter assembly 170.

In some embodiments, a positioning groove 112 is provided at the mounting port 111 of the volute 110 along a periphery or an edge of the mounting port 111, and the sealing member 130 is arranged in the positioning groove 112.

Figure 5:
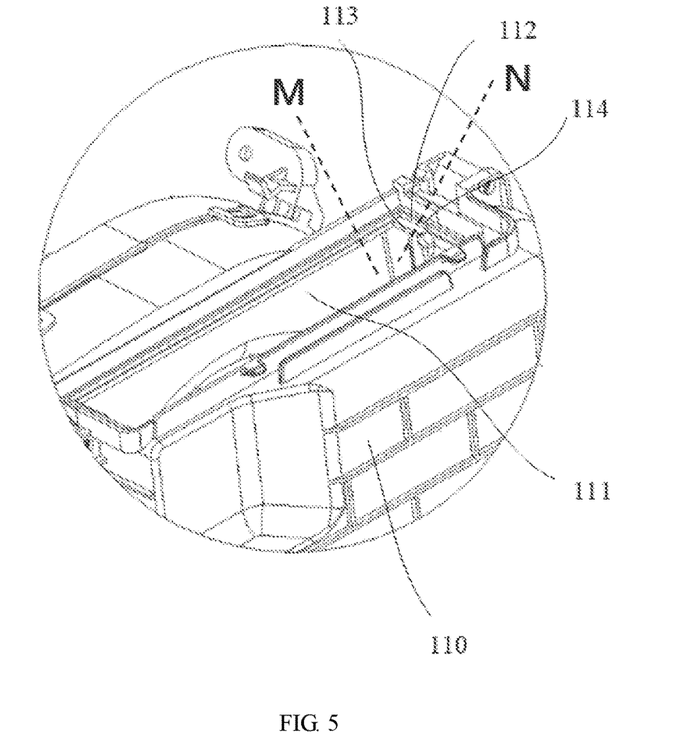
FIG. 5 is an enlarged view of portion A of FIG. 4.
Figure 6:
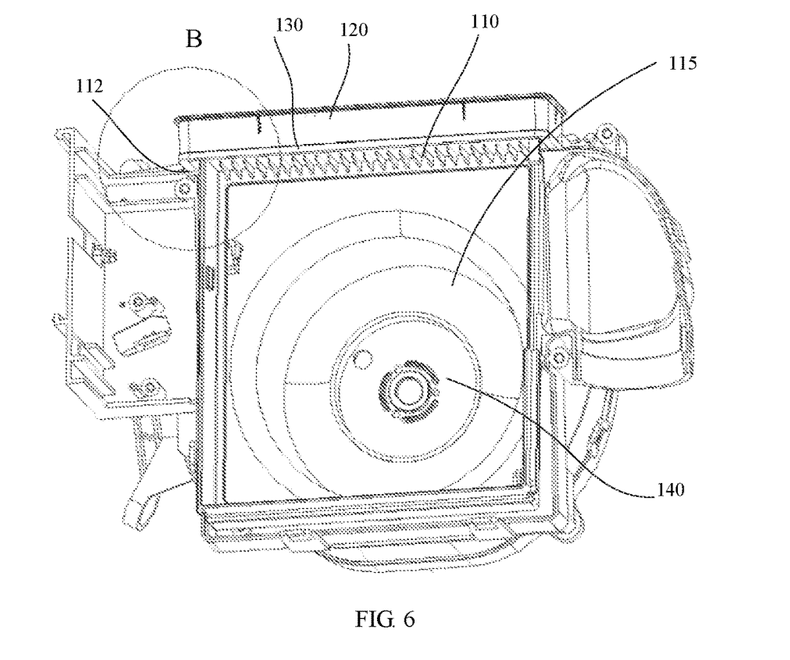
FIG. 6 is another schematic view of a ventilation assembly according to an illustrative embodiment of the present disclosure.
Figure 7:
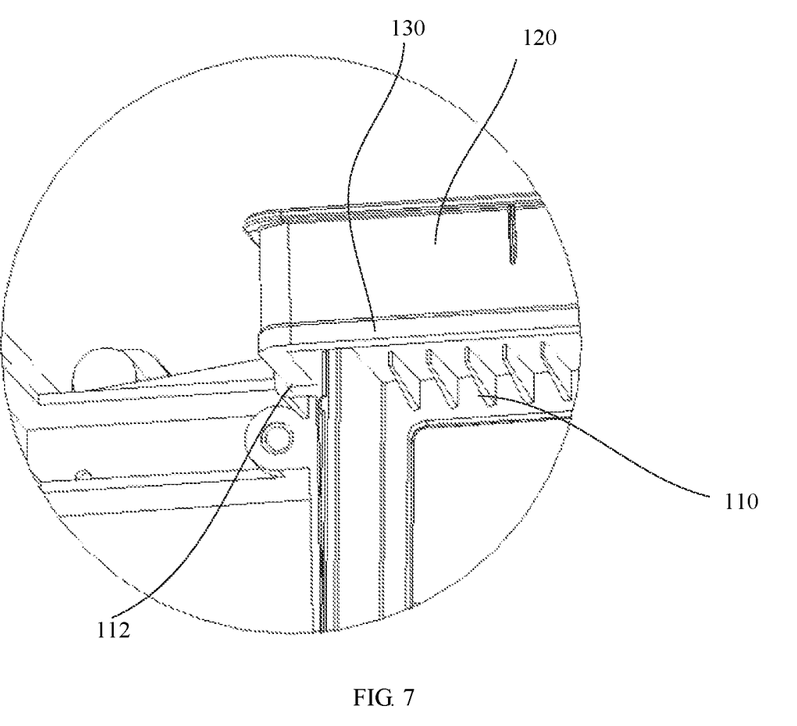
FIG. 7 is an enlarged view of portion B of FIG. 6.

As shown in FIGS. 5 to 7, the positioning groove 112 surrounds the mounting port 111, the positioning groove 112 receives the sealing member 130, and a positioning rib of the positioning groove 112 supports the sealing member 130.

In some embodiments, the sealing member 130 includes a sealing ring.

The sealing ring is substantially annular. Generally, the shape of the sealing member 130 is substantially the same with the shape of the positioning groove 112. For example, when the positioning groove 112 has a square ring shape, the sealing member 130 also has a square ring shape, and when the positioning groove 112 has a circular ring shape, and the sealing member 130 also has a circular ring shape.

In some embodiments, a thickness of the sealing member 130 is slightly greater than a width of the positioning groove 112, and the sealing member 130 is in an interference fit with the positioning groove 112 so as to be clamped in the positioning groove, thereby ensuring that the sealing member 130 tends not to get loose after assembling. In some embodiments, the sealing member 130 and the positioning groove may have an interference fit of 0.1 mm to 0.2 mm.

In some embodiments, a difference between inner and outer radiuses of the sealing member 130 is slightly greater than a distance between a top and a bottom of the positioning groove 112 (e.g., 0.3 mm) so that the sealing member 130 is in an interference fit with a mounting part 121 of the bracket 120 in the filter assembly 170 so as to realize the sealing at the mounting port 111.

It should be noted that the thickness of the sealing member 130 is defined in a direction perpendicular to a plane where the sealing member 130 is, and the inner and outer radiuses of the sealing member 130 are defined in the plane where the sealing member 130 is. Accordingly, the width of the positioning groove 112 is defined in the direction perpendicular to the plane where the sealing member 130 is, and the distance between the top and the bottom of the positioning groove 112 is defined in the plane where the sealing member 130 is and in a direction parallel to a radial direction of the sealing member 130. That is, the top and the bottom of the positioning groove 112 are defined in the direction parallel to the radial direction of the sealing member 130.

Figure 8:
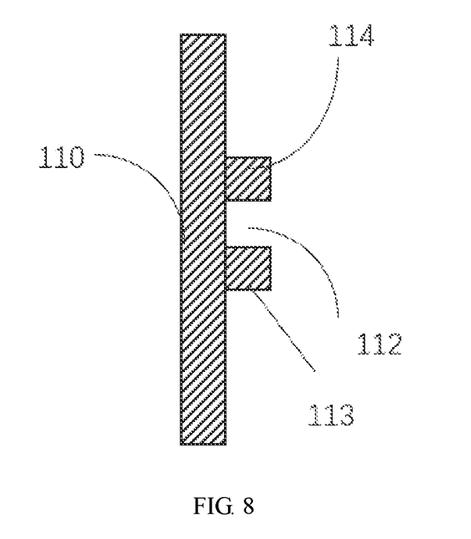
FIG. 8 is a partial sectional view taken along line M of FIG. 5.
Figure 9:
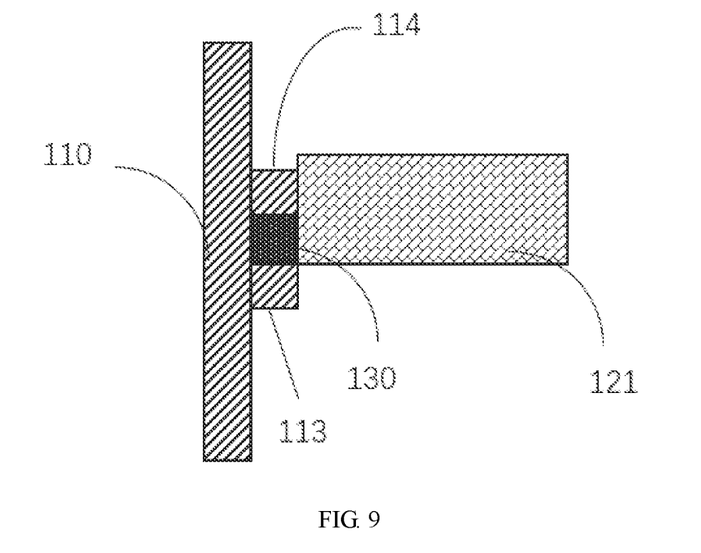
FIG. 9 is a schematic view illustrating a sealing member and a mounting part of a filter assembly added in FIG. 8.

Referring to FIGS. 8 and 9, when the ventilation assembly is assembled, the sealing member 130 is first placed in the positioning groove 112, and then the filter assembly 170 is placed in the mounting port 111. Then, a pressure is applied to the filter assembly 170, the filter assembly 170 presses the sealing member 130, and the sealing member 130 of the elastic material is deformed after being pressed. Since the difference between the inner radius and the outer radius of the sealing member 130 is larger than the distance between the top and the bottom of the positioning groove 112, the sealing member 130 which is not pressed may protrude out of the top of the positioning groove 112, and the sealing member 130 which is pressed to deform may generate a reactive force to the mounting part 121 of the bracket 120 in the filter assembly 170, so that the sealing member 130 and the filter assembly 170 are tightly fitted with each other, thus realizing the sealing of the mounting port 111.

In some embodiments, the ventilation assembly further includes a fastening structure, and the fastening structure includes a first fastener arranged with the volute 110 and a second fastener arranged with the filter assembly 170. The first fastener and the second fastener are engaged after at least part of the filter assembly 170 is inserted into the air channel 115, so as to prevent the filter assembly 170 from being separated from the volute 110. The fastening structure is configured to reinforce the connection of the filter assembly 170 and the volute 110 so as to further secure the sealing effect of the filter assembly 170 and the sealing member 130 on the mounting port 111.

In some embodiments, the first fastener includes a snap, the second fastener includes a protrusion or a mounting groove, and the snap is engaged with the protrusion or the mounting groove.

In some embodiments, the volute 110 is provided with two positioning ribs on a side wall at the mounting port, i.e. a first positioning rib 114 and a second positioning rib 113, and the two positioning ribs extend circumferentially along the mounting port 111. The positioning groove 112 is formed between the first positioning rib 114 and the second positioning rib 113.

In some embodiments, the first positioning rib 114 and the second positioning rib 113 have the same size, only referring to FIGS. 8 and 9.

In some embodiments, the first positioning rib 114 and the second positioning rib 113 have different sizes. Specifically, a distance between an end face 300 of the first positioning rib 114 facing the mounting port 111 and an end face 400 of the first positioning rib 114 connected to the volute 110 is smaller than the difference between the inner radius and the outer radius of the sealing member 130, and a distance between an end face 500 of the second positioning rib 113 facing the mounting port 111 and an end face 600 of the second positioning rib 113 connected to the volute 110 is larger than the difference between the inner radius and the outer radius of the sealing member 130, only referring to FIGS. 10 and 11.

In some embodiments, a part of the first positioning rib 114 and a corresponding part of the second positioning rib 113 may have the same size, and another part of the first positioning rib 114 and another corresponding part of the second positioning rib 113 may have different sizes, referring to FIG. 5 in combination with FIGS. 8-11.

Figure 10:
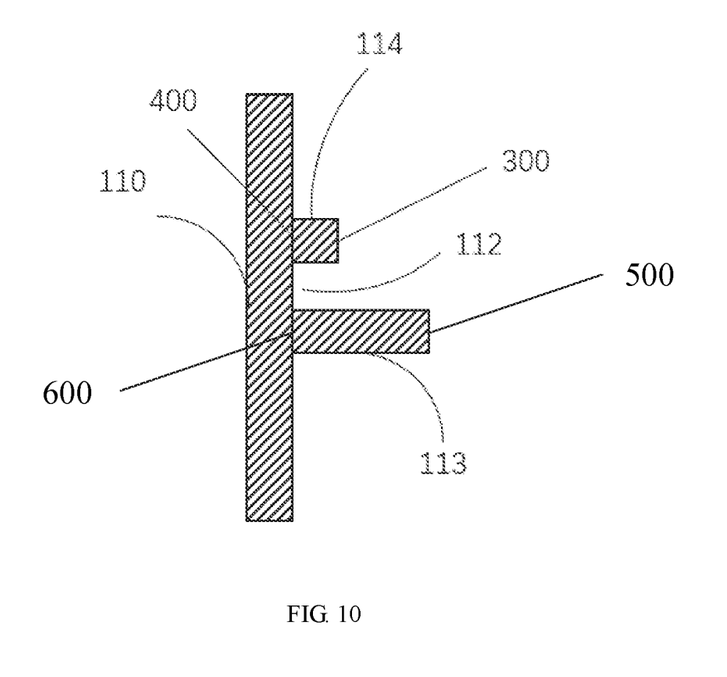
FIG. 10 is a partial sectional view taken along line N in FIG. 5.
Figure 11:
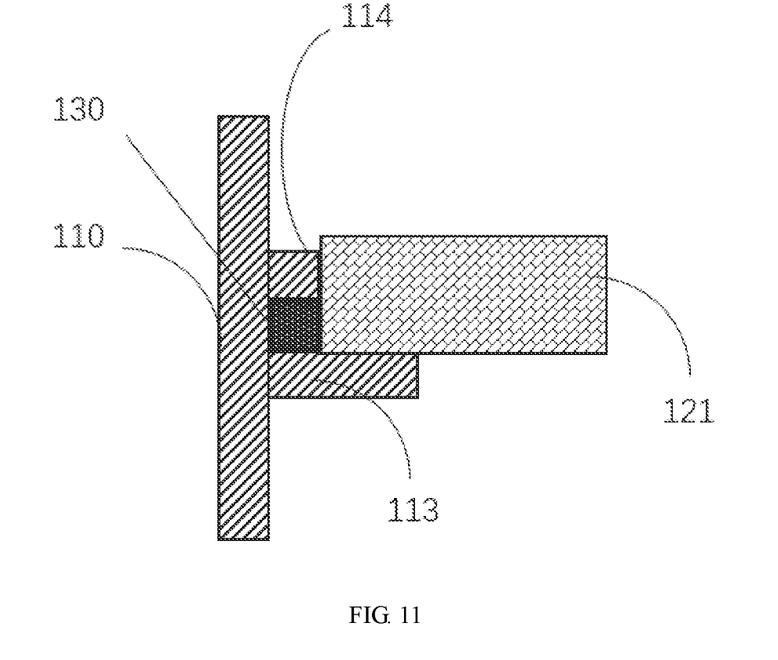
FIG. 11 is a schematic view illustrating a sealing member and a mounting part of a filter assembly added in FIG. 10.

Referring to FIGS. 10 and 11, when the sealing member 130 is arranged in the positioning groove 112, an upper surface of the sealing member 130 abuts against the first positioning rib 114, and a lower surface of the sealing member 130 abuts against the second positioning rib 113. Since the distance between the end face 500 of the second positioning rib 113 facing the mounting port 111 and the end face 600 of the second positioning rib 113 connected to the volute 110 is larger than the difference between the inner radius and the outer radius of the sealing member 130, the second positioning rib 113 has a position limiting function to the sealing member and prevents the sealing member 130 from inadvertently falling into the volute through the mounting port 111 during mounting.

It should be noted that the upper surface and the lower surface of the sealing member 130 are defined in the direction perpendicular to the plane where the sealing member 130 is.

In some embodiments, an air channel 115 communicating with the mounting port 111 is provided in the volute. The bracket 120 includes a mounting part 121 and a supporting part 122. The mounting part 121 covers the mounting port 111. The supporting part 122 is connected with the mounting part 121 and arranged in the air channel 115, and the filter screen is connected with the mounting part 121 and/or the supporting part 122. The sealing member 130 is arranged in a gap between the mounting part 121 and the volute 110.

As shown in FIG. 4, the mounting part 121 has a shape and a size substantially matching with those of the mounting port 111 so as to cover the mounting port 111, and the supporting part 122 has a shape and a size slightly smaller than those of the mounting port, so that when the filter assembly 170 is mounted, the supporting part 122 can pass through the mounting port 111 to be arranged in the air channel 115, and the mounting portion 121 does not pass through the mounting port 111 to enter the air channel 115, but is stuck at the mounting port 111. The mounting part 121 may be a plate-shaped structure.

The supporting part 122 arranged in the air channel 115 can better support the filter screen arranged with the supporting part 122, so that the problems of deformation of the filter screen or the like caused by a high air flowing speed in the air channel 115 are reduced.

As shown in FIG. 4, the supporting part 122 is a rectangular frame. In some embodiments, the supporting part 122 may also have a T shape, a grid shape, an arch shape, a closed or unclosed ring shape, etc.

In some embodiments, the supporting part 122 and the mounting part 121 together form a mounting opening 123, and the filter screen is arranged in the mounting opening 123.

In some embodiments, as shown in FIG. 4, the supporting part 122 and the mounting part 121 together form a closed annular structure, the filter screen has a shape substantially the same with a shape of the annular structure, and a cross-sectional area of the filter screen is greater than or equal to a cross-sectional area of the annular structure to ensure that the filter screen completely covers the mounting opening 123 to ensure the filtering effect.

In some embodiments, the filter assembly 170 is arranged transversely in the air channel 115.

The filter assembly 170 transversely arranged in the air channel 115 can be in contact with the air flow in the largest area, so that the filtering effect is guaranteed.

In some embodiments, in order to further ensure the filtering effect of the filter assembly 170, a sectional area of the filter assembly 170 is greater than or equal to a sectional area of the air channel 115.

In some embodiments of the present disclosure, the ventilation assembly further includes a fan assembly 140 arranged in the volute 110, and an air output surface of the fan assembly 140 is communicated with the air channel 115.

The present disclosure also provides an air conditioning apparatus including the ventilation assembly according to any one of the above embodiments. The air conditioning apparatus may be a fresh air ventilator, an air purifier, an air conditioner or an air humidity conditioning apparatus, etc.

The beneficial effects of the present disclosure can be verified by a following simulation experiment, and the simulation experiment has a general process: the volute 110 is placed on an experimental table, a fan is added at the mounting port 111 of the air channel 115 to blow against the mounting port 111, and after a period of time, the condensation generation of an indoor unit arranged indoors of the air conditioning apparatus is observed. As can be seen from a result of the experiment, the improvement effect of the condensation at the mounting port 111 is significant in this example, compared with the volute 110 which is not provided with the sealing member 130.

The features disclosed in the product embodiments provided by the present disclosure may be combined arbitrarily to obtain a new product embodiment without conflict.

Other embodiments of the disclosure will be apparent to those skilled in the art from consideration of the specification and practice of the disclosure. This disclosure is intended to cover any variations, uses, or adaptations of the present disclosure following the general principles of the present disclosure and including common general knowledge or customary technical means in the art not disclosed in the present disclosure. It is intended that the specification and examples be considered as illustrative only, with a true scope and spirit of the present disclosure being indicated by the following claims.

It is to be understood that the present disclosure is not limited to the precise constructions described above and illustrated in the drawings, and that various modifications and changes may be made without departing from the scope thereof. The scope of the present disclosure is limited only by the appended claims.

What is claimed is:

1. A ventilation assembly, comprising:
   a volute, a surface of the volute being provided with a mounting port;
   a filter assembly arranged in the mounting port or in a portion of the volute adjacent to the mounting port, and configured to filter air; and
   a sealing member arranged with the mounting port or with the portion of the volute adjacent to the mounting port, and configured to seal a gap between the filter assembly and the mounting port,
   wherein a positioning groove is provided at the mounting port of the volute along a periphery of the mounting port, and the sealing member is arranged in the positioning groove,
   wherein a difference between inner and outer radiuses of the sealing member is slightly greater than a distance between a top and a bottom of the positioning groove, so that the sealing member is in an interference fit with the filter assembly.

2. The ventilation assembly according to claim 1, wherein the sealing member has a shape the same with a shape of the gap between the filter assembly and the mounting port.

3. The ventilation assembly according to claim 1, wherein the filter assembly comprises a bracket, a part of the bracket adjacent to the mounting port is configured to have a shape the same with a shape of the mounting port to cover the mounting port;
   the sealing member is arranged between the bracket and the volute and has a shape the same with a shape of a gap between the bracket and the mounting port.

4. The ventilation assembly according to claim 1, wherein a thickness of the sealing member is slightly larger than a width of the positioning groove, so that the sealing member is clamped in the positioning groove through an interference fit with the positioning groove.

5. The ventilation assembly according to claim 1, wherein a first positioning rib and a second positioning rib are arranged at the mounting port of the volute, and the positioning groove is formed between the first positioning rib and the second positioning rib.

6. The ventilation assembly according to claim 5, wherein a distance between an end face of the first positioning rib facing the mounting port and an end face of the first positioning rib connected to the volute is smaller than a difference between inner and outer radiuses of the sealing member;
   a distance between an end face of the second positioning rib facing the mounting port and an end face of the second positioning rib connected to the volute is larger than the difference between the inner and outer radiuses of the sealing member.

7. The ventilation assembly according to claim 3, wherein an air channel communicated with the mounting port is arranged in the volute,
   the bracket comprises:
   a mounting part having a shape the same with the shape of the mounting port to cover the mounting port; and
   a supporting part connected with the mounting part, arranged in the air channel and configured to support a filter screen connected with the supporting part,
   the sealing member is arranged between the mounting part and the volute.

8. The ventilation assembly according to claim 7, wherein the bracket further comprises an operating member arranged with a surface facing away from the air channel.

9. An air conditioning apparatus, comprising a ventilation assembly, the ventilation assembly comprising:
   a volute, a surface of the volute being provided with a mounting port;
   a filter assembly arranged in the mounting port or in a portion of the volute adjacent to the mounting port, and configured to filter air; and
   a sealing member arranged with the mounting port or with the portion of the volute adjacent to the mounting port, and configured to seal a gap between the filter assembly and the mounting port,
   wherein a positioning groove is provided at the mounting port of the volute along a periphery of the mounting port, and the sealing member is arranged in the positioning groove,
   wherein a difference between inner and outer radiuses of the sealing member is slightly greater than a distance between a top and a bottom of the positioning groove, so that the sealing member is in an interference fit with the filter assembly.

10. The air conditioning apparatus according to claim 9, wherein the sealing member has a shape the same with a shape of the gap between the filter assembly and the mounting port.

11. The air conditioning apparatus according to claim 9, wherein the filter assembly comprises a bracket, a part of the bracket adjacent to the mounting port is configured to have a shape the same with a shape of the mounting port to cover the mounting port;

the sealing member is arranged between the bracket and the volute and has a shape the same with a shape of a gap between the bracket and the mounting port.

12. The air conditioning apparatus according to claim 9, wherein a thickness of the sealing member is slightly larger than a width of the positioning groove, so that the sealing member is clamped in the positioning groove through an interference fit with the positioning groove.

13. The air conditioning apparatus according to claim 9, wherein a first positioning rib and a second positioning rib are arranged at the mounting port of the volute, and the positioning groove is formed between the first positioning rib and the second positioning rib.

14. The air conditioning apparatus according to claim 13, wherein a distance between an end face of the first positioning rib facing the mounting port and an end face of the first positioning rib connected to the volute is smaller than a difference between inner and outer radiuses of the sealing member;

a distance between an end face of the second positioning rib facing the mounting port and an end face of the second positioning rib connected to the volute is larger than the difference between the inner and outer radiuses of the sealing member.

15. The air conditioning apparatus according to claim 11, wherein an air channel communicated with the mounting port is arranged in the volute, the bracket comprises:
a mounting part having a shape the same with the shape of the mounting port to cover the mounting port; and
a supporting part connected with the mounting part, arranged in the air channel and configured to support a filter screen connected with the supporting part, the sealing member is arranged between the mounting part and the volute.

16. The air conditioning apparatus according to claim 15, wherein the bracket further comprises an operating member arranged with a surface facing away from the air channel.

17. A ventilation assembly, comprising:

a volute, a surface of the volute being provided with a mounting port;

a filter assembly arranged in the mounting port or in a portion of the volute adjacent to the mounting port, and configured to filter air; and a sealing member arranged with the mounting port or with the portion of the volute adjacent to the mounting port, and configured to seal a gap between the filter assembly and the mounting port, wherein a positioning groove is provided at the mounting port of the volute along a periphery of the mounting port, and the sealing member is arranged in the positioning groove, wherein a first positioning rib and a second positioning rib are arranged at the mounting port of the volute, and the positioning groove is formed between the first positioning rib and the second positioning rib, wherein a distance between an end face of the first positioning rib facing the mounting port and an end face of the first positioning rib connected to the volute is smaller than a difference between inner and outer radiuses of the sealing member;

a distance between an end face of the second positioning rib facing the mounting port and an end face of the second positioning rib connected to the volute is larger than the difference between the inner and outer radiuses of the sealing member.

* * * * *